United States Patent [19]

Walter et al.

[11] Patent Number: 4,553,796
[45] Date of Patent: Nov. 19, 1985

[54] MECHANISM INCLUDING A BEARING ASSEMBLY FOR MEMBERS ADAPTED FOR LONGITUDINAL MOVEMENT RELATIVE TO ONE ANOTHER

[75] Inventors: Lothar Walter, Schweinfurt; Walter Reith, Bad Bocklet; Otmar Winkler, Schweinfurt, all of Fed. Rep. of Germany

[73] Assignee: SKF Kugellagerfabriken GmbH, Schweinfurt, Fed. Rep. of Germany

[21] Appl. No.: 633,406

[22] Filed: Jul. 23, 1984

[30] Foreign Application Priority Data

Jul. 23, 1983 [JP] Japan ................... 58-3326601

[51] Int. Cl.⁴ .................. F16C 31/06; F16C 29/06
[52] U.S. Cl. ......................... 308/6 C; 308/6 R
[58] Field of Search ............ 308/6 C, 3 R, 3 A, 6 A, 308/4 R, 6 R

[56] References Cited

U.S. PATENT DOCUMENTS

| | | | |
|---|---|---|---|
| 3,086,824 | 4/1963 | Barkley | 308/6 C |
| 3,245,731 | 4/1966 | Erikson | 308/6 C |
| 3,844,629 | 10/1974 | Haines | 308/6 C |
| 3,900,233 | 8/1975 | Thomson | 308/6 C |
| 3,951,472 | 4/1976 | Schurger et al. | 308/6 C |
| 3,967,865 | 7/1976 | Walter et al. | 308/6 C |
| 4,271,716 | 6/1981 | Carduner | 308/6 C X |

*Primary Examiner*—Stuart S. Levy
*Assistant Examiner*—Thomas R. Hannon
*Attorney, Agent, or Firm*—Eugene E. Renz, Jr.

[57] ABSTRACT

A ball bearing for longitudinal movement on a shaft or the like, comprising a cage which at least partially surrounds the shaft and is installed in the bore of a housing, ball guides consisting of axial guide tracks for the loaded and unloaded balls arranged next to each other around the periphery with semi-circular deflector tracks joining pairs of these guide tracks, endless rows of balls guided in the guide tracks, and at least one raceway element supported in the bore of the housing carrying the loaded balls of one or more guide tracks on its radially inwardly directed raceway, a longitudinal fillet projecting radially from the inside and toward the outside approximately as far as the height of the centers of the balls between two guide tracks of each ball guide and formed on the cage in such a way that the radius of curvature of each ball guide passing through the centers of the balls of the deflector tracks is equal to or slightly larger than half the diameter of the balls.

8 Claims, 8 Drawing Figures

MECHANISM INCLUDING A BEARING ASSEMBLY FOR MEMBERS ADAPTED FOR LONGITUDINAL MOVEMENT RELATIVE TO ONE ANOTHER

BACKGROUND OF THE INVENTION

The present invention relates to mechanism including a ball bearing assembly for members adapted for longitudinal movement relative to one another.

These assemblies typically comprise a shaft mounted in the bore of a housing and a ball bearing assembly surrounding the shaft and of a configuration and orientation to effect longitudinal or axial displacement of the shaft relative to the housing upon rotation of the shaft. These assemblies usually include a cage with ball guides arranged to effect movement of the balls in an endless path.

In a prior known ball bearing of the type described, the curvature of the deflector tracks of each ball guide passes through the centers of the balls and its radius is considerably larger than half the diameter of the balls thereby forming radially projecting island sections on the cage which guide the balls of two adjacent guide tracks of an individual ball guide at a relatively large distance from each other in the longitudinal direction. This arrangement is shown in West German registered design No. 73-45379. By reason of this large distance, each ball guide requires a relatively large amount of space in the peripheral direction for installation. By reason of this, it is possible to house only a relatively small number of ball guides. This, in turn, results in a reduction in load capacity of the ball bearing which depending on the application in some instances is not sufficient.

The above problem may be solved in principle by shifting the guide track of the unloaded balls of each ball guide radially outwardly with respect to the associated or complementary guide track of the loaded balls so that the two guide tracks are arranged to some extent radially one on top of the other. This arrangement, however, would consume a relatively large amount of space in the radial direction which is undesirable in many cases.

SUMMARY OF THE PRESENT INVENTION

With the foregoing in mind, it is an object of the present invention to provide a ball bearing assembly for longitudinal movement of the type described which takes up comparatively small space and yet has a high load carrying capacity. To this end, the assembly, in accordance with the present invention, consists of a cage which at least partially surrounds a shaft and is installed in the bore of the housing and providing ball guides consisting of axial guide tracks for the loaded and unloaded balls which are arranged next to each other around the periphery with semi-circular deflector tracks joining pairs of the guide tracks. An endless row of balls is guided in these guide tracks. The assembly further includes at least one raceway element supported in the bore of the housing which carries the loaded balls of one or more guide tracks on its radially inwardly directed raceway. A longitudinal fillet projects radially from the inside and toward the outside approximately as far as the height of the centers of the balls between two guide tracks of each ball guide and is formed on the cage in such a way that the radius of curvature of each ball guide passing through the centers of the balls of the deflector tracks is equal to or slightly larger than half the diameter of the balls. Thus, in accordance with the present invention, two axial guide tracks of each ball guide are located approximate one another and spaced only by an extremely short distance which can be equal to zero. Further, between the balls of these two guide tracks there are no difficult to manufacture island sections projecting radially outwardly beyond the centers of the balls. In this way, a relatively large number of balls can be housed around the periphery of the assembly which means that the bearing arrangement has a high load carrying capacity.

Additionally, by the construction described above, the radius of curvature of the deflector tracks is small so that they project only a very small extent in the axial direction as well. In view of this, the adjacent axial guide tracks extend over a relatively large part of the axial length of the ball bearing. The supporting length of the guide tracks filled with loaded balls is accordingly enlarged so that this is also a contributing factor providing a high load capacity.

In accordance with another feature of the present invention, the assembly includes an axial guide fillet projecting radially toward the inside or toward the outside to a point not exceeding that of the centers of the balls between two guide tracks which are directly adjacent one another in the cage and which belong to two adjacent ball guides connected to the cage or to the raceway in such a way that the distance on the peripheral side between the balls and these two guide tracks is equal to or slightly larger than zero. Thus, the guide tracks of two adjacent ball guides directly adjacent each other in the cage are at an optimally small distance apart in the peripheral direction.

In accordance with another feature of the present invention, the two axial guide tracks of the loaded balls or of the unloaded balls of each pair of ball guides are directly adjacent each other in the cage and the guide fillet is formed by a strip engaging in a form-locking manner in a longitudinal groove in the raceway of one of the raceway elements. By this design the loaded or the unloaded balls of a pair of adjacent ball guides roll in each case on a common raceway element, the peripheral side width of which is relatively small. In this manner, even though the ball bearing has a high load carrying capacity, it is relatively easy and economical to manufacture comprising very few parts which are compactly oriented.

In accordance with still another feature of the present invention, the axial guide tracks of the unloaded balls of each pair of ball guides are approximate one another in the cage and the unloaded balls in these two guide tracks are guided along a wall on the peripheral side and base surface of an axially continuous longitudinal recess in the raceway of the associated race element. In this manner the radial load carrying forces of the loaded balls of a pair of adjacent ball guides act at an equal distance apart on a common raceway element so that these forces are distributed over the entire width of the raceway element and an advantageously low level of surface pressure is created between the raceway element and the bore of the housing.

In accordance with still another feature of the present invention, the guide tracks of the unloaded balls of each ball guide are shifted in the cage either radially outwardly or radially inwardly with respect to the associated guide track of the loaded balls. In this manner, a ball bearing with an especially high load carrying capacity is provided wherein a large, optimum number of balls are housed around the periphery for each ball guide which requires a space whose width in the peripheral direction is smaller than twice the diameter of the balls.

The deflector tracks are preferably semi-circular in cross section and are convex radially toward the outside or concave radially toward the inside. By reason of this arrangement, the deflector track is longer because of its outward or inward curvature so that the balls and the deflector track are gradually deflected from one guide track to the other in spite of the fact that the radius of curvature when seen in a radially top view appears to be comparatively small.

The raceway elements of the assembly are provided with a radially outwardly facing lateral surface which is supported in the bore of the housing and is of a configuration to form-lock with the bore and in this way provide a secure attachment in the housing bore.

In accordance with still another feature, the loaded balls of at least one of the guide tracks of the ball guides of the cage are arranged to roll on a groove-shaped or shoulder-shaped raceway of the shaft and/or of the raceway elements. In this manner the ball bearing can transmit greater torque from the shaft to the housing.

BRIEF DESCRIPTION OF THE DRAWINGS

These and other objects of the present invention and the various features and details of the operation and construction thereof are hereinafter more fully set forth with reference to the accompanying drawing, wherein.

DESCRIPTION OF THE PREFERRED EMBODIMENTS

Figure 1:
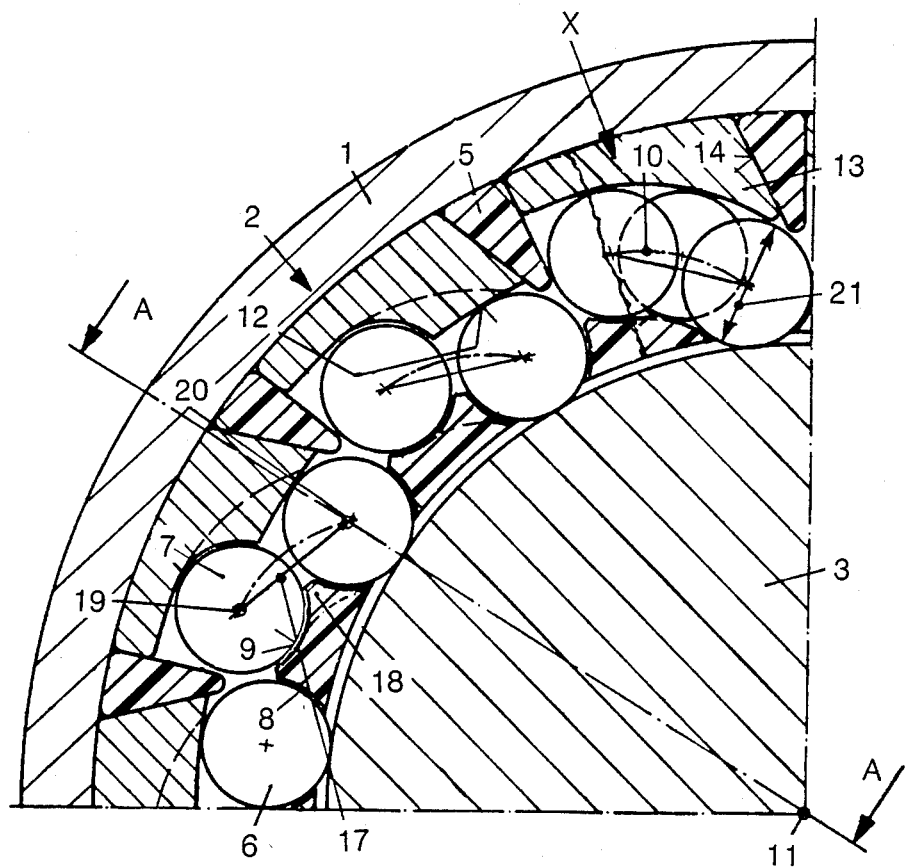
FIG. 1 is a fragmentary cross sectional view through a ball bearing assembly in accordance with the present invention.

Referring now to the drawings and particularly to FIG. 1 thereof, there is illustrated an assembly comprising machine elements which are capable of longitudinal movement relative to one another and also of transmitting torque which incorporates a bearing arrangement in accordance with the present invention.

Figure 2:
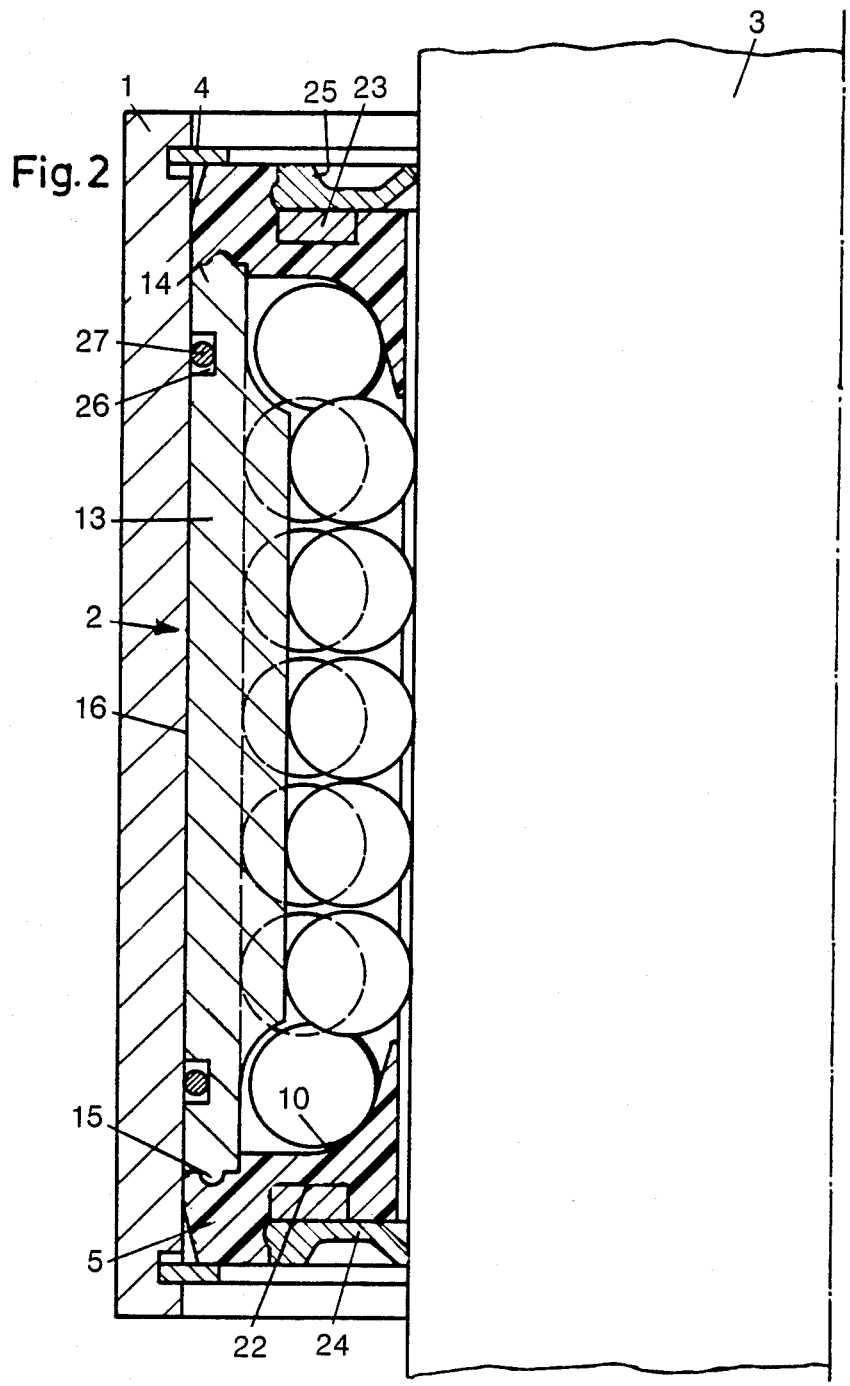
FIG. 2 shows a longitudinal section taken along lines A—A of FIG. 1 through the housing.

Considering now the overall apparatus illustrated in FIGS. 1 and 2, the numeral 1 represents a housing having a bore 1a for a shaft member 3 capable of axial movement relative to the housing by means of a ball bearing assembly 2 disposed in the annular space between the shaft and housing bore. As illustrated in FIG. 2, the bearing assembly is held laterally in place in bore 1a of the housing 1 by means of snap rings 4 which fit into an annular groove 1b in the bore of the housing 1.

The bearing assembly comprises a sleeve-shaped cage 5 which may be made of an injection molded plastic material. The ball guides around the periphery of the cage support an endless row of balls 6, 7. Each ball guide as illustrated consists of axial guide tracks 8, 9 for the loaded and unloaded rows of balls 6, 7 respectively disposed next to each other on the periphery and deflector tracks 10 (see the cut-away area marked "x" in FIG. 1) which extend radially outwardly convexly and which connect guide tracks 8, 9 to each other in pairs.

In the present instance, the balls of the loaded row 6 of each ball guide run on a raceway 12 formed in a raceway member 13. The raceway 12 is in the shape of a cylindrical segment and is concentric to the axis 11 of the bearing. The loaded balls 6, in this instance, roll between the radially inwardly facing raceway 12 and the cylindrical lateral surface of shaft 3 and are guided in axial guide track 8 of the associated ball guide.

As illustrated in FIG. 1, each raceway element 13 is inserted in a radial window 14 projecting through cage 5 so that its longitudinal projections 15 snap into a corresponding recess 14a, in the opposite wall of window 14 and hold it rigidly in the radial direction on cage 5 in the manner illustrated in FIG. 2. Raceway member 13 has a radially outwardly facing lateral surface 16 which form-locks with the cylindrical bore 1a of housing 1 and which is supported in the bore of the housing.

As illustrated in FIG. 1, each raceway element 13 overlies to deflect the deflector tracks 10 and the pair of associated axial guide tracks 8, 9 of a ball guide. Guide track 9 of the unloaded row of balls of each ball guide is shifted radially outwardly in cage 5 with respect to the associated guide track 8 of the loaded row of balls 6. A longitudinal fillet 18 on cage 5 projects radially outwardly to within a short distance of a transverse line 17 between two axial guide tracks 8 and 9 of each ball guide. As illustrated, transverse line 17 extends through the centers 19, 20 of the balls in the unloaded and loaded rows 6, 7 which as illustrated are next to each other in the transverse direction in the two guide tracks 8, 9. The radius of curvature extending through the centers of the balls in the rows 6, 7 which is perpendicular to the transverse line 17 as viewed from the top on each deflector track 10 is slightly larger than half the diameter 21 of the balls.

Each of the two end surfaces of cage 5 has a recess 22 extending around the surface with a rectangular cross section. A ring 23 of steel in the present case is pressed into this axial recess 22; the ring completely fills recess 22 and thus stiffens cage 5. A rubber sealing ring 24 is vulcanized onto ring 23, which with its lateral surface is snapped into an annual groove 25 in the bore of cage 5 and slides with its sealing lip on shaft 3.

Both cage 5 and raceway elements 13 have on each of their two axial ends a circumferential common external groove 26, into which a snap ring 27 is inserted, which presses the raceway elements 13 radially inward without play.

Figure 3:
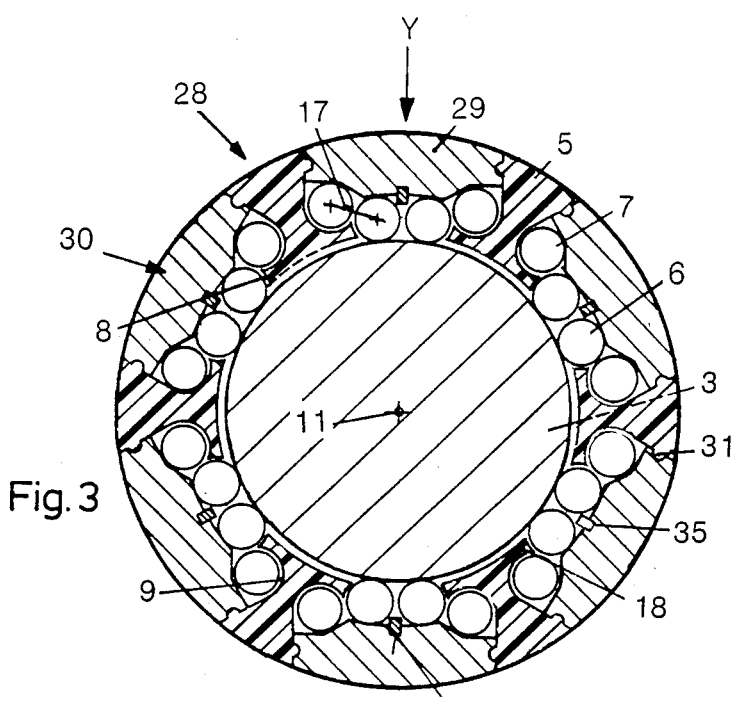
FIG. 3 is a cross sectional view through a modified ball bearing assembly for longitudinal movement in accordance with the present invention.
Figure 4:
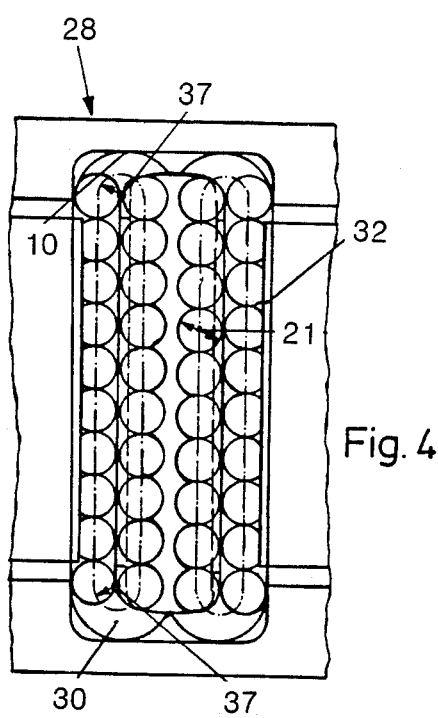
FIG. 4 is a partial top plan view taken in the direction of the arrow Y in FIG. 3 with the raceway element removed.
Figure 5:
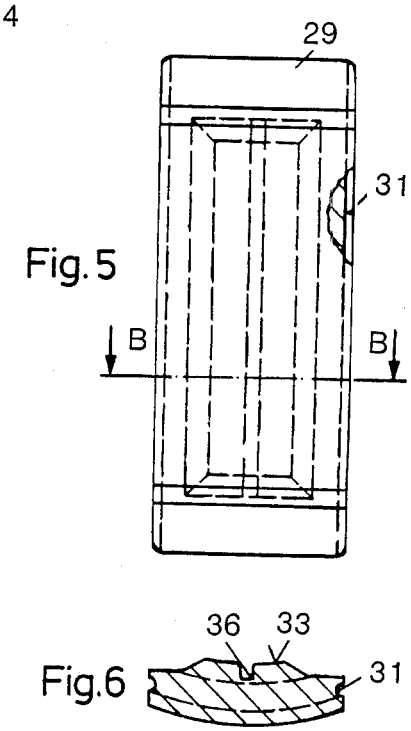
FIG. 5 is a top plan view showing a raceway element of the ball bearing assembly shown in FIG. 3.
Figure 6:
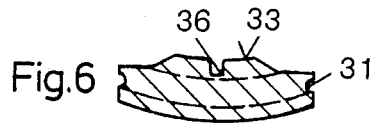
FIG. 6 is a sectional view taken on lines B—B of FIG. 5.

FIGS. 3 and 4 show a modified ball bearing 28, which consists of a cage 5 of elastic plastic, which is provided with ball guides and which surrounds the shaft 3, and of raceway elements 29 of steel, which are arranged around the periphery of cage 5 and which are supported in the bore of a housing (not shown).

In the injection-molding process, radial window openings 30 are molded into the periphery of cage 5, in each of which one raceway element 29 is installed. Raceway element 29 has at its two boundary walls on the peripheral side an axial attachment groove 31, into which a longitudinal rib 32 of the opposite wall of window opening 30 of cage 5 is snapped (FIGS. 3, 4, 5 and 6).

Each raceway element 29 has a radially inwardly facing cylindrical raceway 33, which is concentric to the bearing axis 11. The loaded balls 6 of two axial guide tracks 8 belonging to one pair of ball guides in each case roll on raceway 33 of each raceway element 29.

In the present case, the two guide tracks 8 of the loaded balls 6 of a pair of ball guides are directly adjacent to each other in a raceway element 29. The loaded balls 6 of the two guide tracks 8 are kept at an extremely small distance from each other by means of a strip 35 with a rectangular cross section 34, which is connected to raceway element 29. This strip 35 acts as a guide piece, which guides the loaded balls 6 of the two ball guides in the axial direction It is fixed in place here by bonding it adhesively into a longitudinal groove 36 of raceway element 29 machined in raceway 33.

Each raceway element 29 covers radially from the outside both the deflector tracks 10 and also the axial guide tracks 8, 9 of the pair of ball guides in question.

Between the two guide tracks 8, 9 of each ball guide of cage 5 there is a longitudinal fillet 18 projecting from the inside toward the outside, which is integral with cage 5. This longitudinal fillet 18 extends almost up to the transverse line 17, which is oriented transversely to the bearing axis 34 and passes through the center of an unloaded ball 7 in the one guide track 9 and through the center of the loaded ball 6 arranged next to it in the peripheral direction of the other guide track 8 of the same ball guide. The centers of balls 6, 7 in each deflector path 10 describe a semicircular deflection curve, the radius of curvature of which 37, when seen from the top, perpendicular to the transverse line 17, is as large as half the diameter 21 of balls 6, 7 (FIG. 4).

Figure 7:
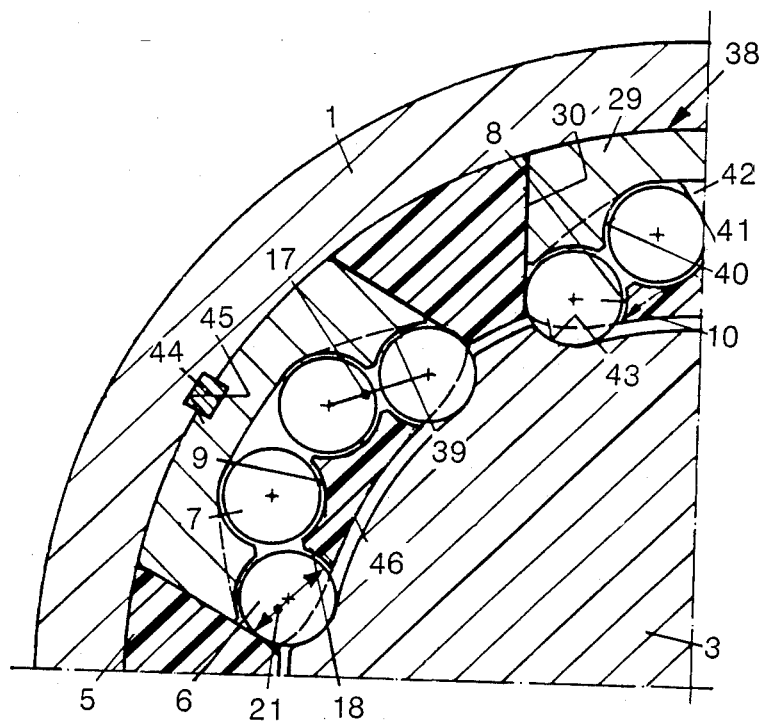
FIGS. 7 and 8 are fragmentary sectional views through a modified ball bearing assembly in accordance with the present invention.

FIG. 7 shows a modified ball bearing 38, which also has several raceway elements 29 installed in each case in a radial window 30 in cage 5. In the present case, these raceway elements 29 for the loaded balls 6 of each of the two guide tracks 8 of a pair of ball guides have a radially inwardly facing groove-shaped raceway surface 39 with a cross section in the form of a circular segment, which is closely adapted to the contour of balls 6. The two guide tracks 8 of unloaded balls 7 of each pair of ball guides are arranged right next to each other in cage 5. The unloaded balls 7 of guide tracks 9 are guided on wall 40 on the peripheral side and on the base surface 41 of an axial, continuous longitudinal recess 42 in the raceway surface 39 of the associated raceway element 29.

The loaded balls 6 of each guide track 8 of cage 5 run in each case on a shoulder-like raceway 43 of shaft 3. The loaded balls 6 thus transmit not only radial forces, but also torque from shaft 3 to housing 1.

On the lateral surface of a raceway element 29 arranged around the circumference of cage 5, a longitudinal groove is machined, in which a spring 44 is seated. This spring 44 engages in a continuous axial groove 45 in the bore of housing 1 and thus fixes the ball bearing 38 in housing 1 so that it cannot turn.

Between two immediately adjacent guide tracks in cage 5, an axial guide fillet 46 which projects radially from the inside toward the outside is integral with cage 5. This guide fillet extends to within a short distance of the centers of balls 7 in the two guide tracks 9 which are next to each other. The distance between two balls 7 on the peripheral side is almost equal to zero.

Figure 8:
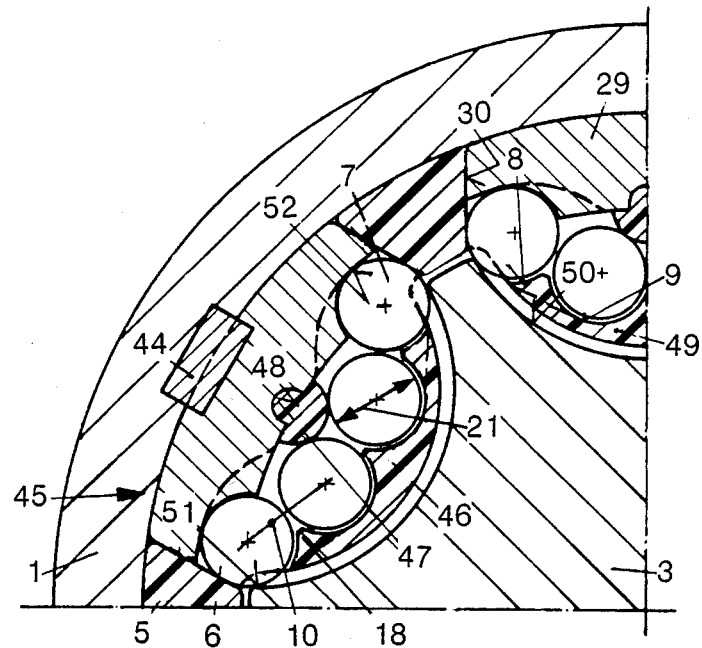

FIG. 8 shows a modified ball bearing 45a, which again has several raceway elements 29 installed around the periphery of cage 5 in windows 30. A pair of ball guides is arranged radially within each raceway element 29. The two axial guide tracks 9 of unloaded balls 7 of each pair are immediately adjacent to each other. Between these two guide tracks 9 there is a guide fillet 46 formed on cage 5, which projects radially from the inside toward the outside, the cross section of this fillet tapering down toward the outside. This guide fillet 46 extends to within a short distance of the centers of balls 7 in these raceways 9. Balls 7 in the two raceways 9 are extremely close together in the peripheral direction.

A continuous axial attachment groove 47 is machined in the radially inwardly facing boundary surface of each raceway element 29 the side walls of which converge toward the radial groove opening. A strip 48 of elastically compressible plastic filled with lubricant is snapped radially into this attachment groove 47 or drawn axially into it. This strip 48 serves as a guide, which projects from the outside toward the inside between unloaded balls 7 of guide tracks 9, so that the distance between balls 7 on the peripheral side is approximately equal to zero. Strip 48 also contacts unloaded balls 7 with a slight amount of pretension, so that these balls are held without play in their guide tracks 9.

Strip 48 projects axially at its two axial ends beyond the associated raceway element 29 and engages in a corresponding recess (not shown) in the opposite boundary wall of window 30. In this way, each raceway element 29 is held securely in a window 30 of cage 5 and cannot fall out.

In the present cage, cage 5 has six longitudinal oriented convexities 49 with a cross section in the form of a circular segment. These convexities engage with corresponding slots 50 in shaft 3 in the shape of sections of a circle. Each convexity 49 accepts one pair of ball guides. Guide tracks 9 of unloaded balls 7 of each ball guide are shifted radially inwardly with respect to the associated ball guide 8 of the loaded balls 6.

Loaded balls 6 of guide tracks 8 run on a shoulder-like raceway 51 on the opposite, peripheral-sided end of the associated slot 50. In addition, loaded balls 6 run on a shoulder-like raceway 52 of raceway element 29 opposite raceway 51. The contour of the balls 6 is closely adapted to the cross-sectional form of raceway 52. Loaded balls 6 thus transmit both radial forces and torque from shaft 3 to the associated raceway element 29.

A longitudinal fillet 18 is formed on cage 5. This fillet is arranged between two guide tracks 8, 9 of each ball guide and engages between balls 6, 7 of the ball guide radially from the inside toward the outside. Longitudinal fillet 18 extends to within a short distance from the center of balls 6, 7 in these guide tracks 8, 9. Guide tracks 8, 9 are connected to each other in pairs by semicircular deflector tracks 10. The two deflector tracks 10 of each ball guide have a radius of curvature passing through the centers of balls 6, 7 which when seen from the top is approximately as large as half the diameter 21 of balls 6, 7.

The ball bearing according to the invention can be modified in its design. For example, in place of the raceway elements installed in the windows, there can be only a single raceway element, which encloses the cage like a ring and which has axial raceways in its bore for the loaded balls of each ball guide.

In addition, the cage of the ball bearings does not have to be designed as a closed shell. Instead, it can be in the so-called "open-design", in which a continuous axial slot is present so that support elements can pass through to the shaft, the shaft being only partially surrounded. The required rigidity of the cage which has been weakened by the slot can then be taken care of by a C-shaped ring 23 of steel, which is inserted into a corresponding recess in the end of cage 5 (see FIG. 2). If needed, the load capacity of one and the same ball bearing can be adapted to particular applications in that, for example, in the exemplary embodiment shown in FIG. 1, only every second window 14 on the periphery of cage 5 is filled with balls 6, 7. The empty windows 14 on the periphery of cage 5 can then be sealed off radially from the outside by means of simple plastic caps which are snapped into the windows 14 in place of raceway plates 13.

The curvature of the deflector tracks can deviate slightly from the semicircular. Instead of convex deflector tracks extending radially outwardly, a concave deflector path extending radially inwardly can be provided.

The spring ring 27 of the ball bearing shown in FIG. 2 can be also be used to secure the ball bearing 2 in place axially in the bore of housing 1. For this purpose, an annular groove radially opposite the external groove 26 of cage 5 and raceway elements 13 is machined in the bore of housing 1. The spring ring engages only partially in this groove, so that the snap rings 4 shown in FIG. 2 are no longer needed.

SUMMARY

A ball bearing 2 for longitudinal movement has a cage 5 installed in the bore of a housing 1, said cage having several ball guides provided in it for in each case one endless row of balls 6, 7. Each ball guide consists of an axial guide track 8 for the loaded balls 6, an axial guide track 9 for the unloaded balls 7, and semicircular deflector tracks 10, which connect the other two tracks to each other in pairs. The loaded balls 6 of a guide track 8 are carried on the radially inwardly facing raceway surface 12 of a raceway element 13, which is supported in the bore of the housing 1.

So that the ball bearing 2 has high load capacity in spite of its small size, a longitudinal fillet 18 is provided on the cage 5. This fillet projects radially from the inside to the outside between two guide tracks 8, 9 of each ball guide approximately as far as the centers of the balls 6, 7 so that the radius of curvature of each ball guide extending through the centers of the balls 6, 7 of the deflector tracks 10 is equal to or slightly larger than half the diameter 21 of the balls 6, 7.

What is claimed is:

1. A ball bearing for longitudinal movement on a shaft member or the like comprising a cage which at least partially surrounds the shaft and disposed in the bore of a housing, a raceway element (13) supported in the bore of the housing having a raceway surface for a plurality of axially extending circumferentially spaced guide members disposed adjacent the shaft member, each guide member including arcuate guide tracks (8, 9) for the loaded and unloaded balls, deflector tracks joining adjacent pairs of said guide tracks, a longitudinally extending fillet (18) at the juncture of the radially outwardly directed arcuate ball guide track (8) and the arcuate circumferentially directed guide tracks (9) for the loaded balls, said fillets (18) projecting between adjacent rows of loaded and unloaded rows of balls approximately as far as the height of a line through the centers of the balls (6, 7) between two guide tracks (8, 9) of each ball guide and formed on the cage in such a way that the radius of curvature of each ball guide passing through the centers of the balls of the deflector tracks is equal to or slightly larger than half the diameter (21) of the balls.

2. A ball bearing according to claim 1, including an axial guide fillet projecting radially toward the inside or toward the outside to a level not exceeding that of the centers of the balls between two guide tracks which are directly adjacent to each other in the cage and which belong to two adjacent ball guides and connected to the cage or to the raceway element in such a way that the distance on the peripheral side between the balls in these two guide tracks is equal to or slightly larger than zero.

3. A ball bearing according to claim 1 including several raceway elements, each raceway element inserted in a window pierced radially into the periphery of the cage and guiding the balls of guide tracks belonging to a pair of adjacent ball guides on their radially inwardly-pointing raceways, and wherein the two axial guide tracks are directly adjacent to each other in the cage and wherein the guide fillet is formed by a strip engaging in a form-locking manner in a longitudinal groove in one of the raceway elements.

4. A ball bearing according to claim 1 including several raceway elements installed in each case in a window pierced radially into the periphery of the cage and carrying on their radially inwardly-facing raceway the loaded balls of guide tracks belonging in each case to one pair of adjacent ball guides, and wherein the two axial guide tracks of the unloaded balls of each pair of ball guides are immediately adjacent to each other in the cage and in that the unloaded balls in these two guide tracks are guided along a wall on the peripheral side and a base surface of an axially continuous longitudinal recess in the raceway of the associated raceway element.

5. A ball bearing according to claim 1, characterized in that the guide tracks of the unloaded balls of each ball guide are shifted in the cage either radially outwardly or radially inwardly with respect to the associated guide track of the loaded balls.

6. A ball bearing according to claim 1, characterized in that the semicircular deflector tracks of each ball guide of the cage are convex radially toward the outside or concave radially toward the inside.

7. A ball bearing according to claim 1, characterized in that at least one of the raceway elements has a radially outwardly facing lateral surface, which is supported in the bore of the housing and is made to form-lock with said bore.

8. A ball bearing according to claim 1, characterized in that the loaded balls of at least one of the guide tracks of the ball guides of the cage are arranged to roll on a groove-shaped or shoulder-shaped raceway of the shaft and/or of one of the raceway elements.

* * * * *